US009949198B2

(12) United States Patent
Malhotra et al.

(10) Patent No.: US 9,949,198 B2
(45) Date of Patent: *Apr. 17, 2018

(54) LONG TERM EVOLUTION COMMUNICATION SYSTEM TO PERFORM A MOBILITY MANAGEMENT ENTITY RESELECTION

(71) Applicant: Sprint Communications Company L.P., Overland Park, KS (US)

(72) Inventors: Rajil Malhotra, Olathe, KS (US); Saravana Velusamy, Overland Park, KS (US); Deveshkumar Narendrapratap Rai, Overland Park, KS (US); Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/426,820

(22) Filed: Feb. 7, 2017

(65) Prior Publication Data

US 2017/0150416 A1    May 25, 2017

Related U.S. Application Data

(63) Continuation of application No. 14/826,302, filed on Aug. 14, 2015, now Pat. No. 9,603,001.

(51) Int. Cl.
*H04W 36/00* (2009.01)
*H04W 36/32* (2009.01)
*H04W 72/04* (2009.01)

(52) U.S. Cl.
CPC ....... *H04W 36/32* (2013.01); *H04W 36/0016* (2013.01); *H04W 72/0413* (2013.01)

(58) Field of Classification Search
CPC ............. H04W 36/0016; H04W 36/32; H04W 72/0413; H04W 48/18; H04W 76/02; H04W 8/24; H04W 88/06; H04W 12/06; H04W 28/08; H04W 36/0022; H04W 36/0033; H04W 36/14; H04W 4/14; H04W 4/22; H04W 60/00; H04W 68/00; H04W 76/007; H04W 76/026
USPC ......................................................... 455/437
See application file for complete search history.

(56) References Cited

U.S. PATENT DOCUMENTS

| 2010/0105386 A1* | 4/2010 | Guo ........................ H04W 8/26 455/435.1 |
| 2010/0120399 A1* | 5/2010 | Guo .................. H04L 29/12207 455/411 |
| 2010/0323695 A1 | 12/2010 | Kallio et al. |

(Continued)

FOREIGN PATENT DOCUMENTS

WO    2014160978    10/2014

*Primary Examiner* — Timothy Pham

(57) ABSTRACT

A wireless communication system connects User Equipment (UE) to Mobility Management Entities (MMEs). The wireless communication system receives a connection message from the UE. The wireless communication system connects the UE to a first MME responsive to the connection message. The wireless communication system performs MME re-selection for the UE responsive to the connection message. The wireless communication system connects the UE to a second MME responsive to the MME re-selection.

9 Claims, 6 Drawing Sheets

(56) References Cited

U.S. PATENT DOCUMENTS

| | | | |
|---|---|---|---|
| 2012/0028640 A1* | 2/2012 | Guo | H04L 29/12207 455/435.1 |
| 2012/0231760 A1 | 9/2012 | Zhu et al. | |
| 2013/0083650 A1* | 4/2013 | Taleb | H04W 8/30 370/218 |
| 2014/0219272 A1 | 8/2014 | Shuman et al. | |
| 2014/0376513 A1 | 12/2014 | Poikselka | |
| 2016/0007331 A1* | 1/2016 | Gauba | H04W 72/0406 370/329 |

* cited by examiner

LONG TERM EVOLUTION COMMUNICATION SYSTEM TO PERFORM A MOBILITY MANAGEMENT ENTITY RESELECTION

RELATED CASES

This patent application is a continuation of U.S. patent application Ser. No. 14/826,302 that was filed on Aug. 14, 2015 and is entitled "LONG TERM EVOLUTION COMMUNICATION SYSTEM TO PERFORM A MOBILITY MANAGEMENT ENTITY RESELECTION." U.S. patent application Ser. No. 14/826,302 is hereby incorporated by reference into this patent application.

TECHNICAL BACKGROUND

Wireless data allows users to access services such as mobile Internet, video calling, streaming media, messaging, email, etc. Mobile devices such as laptops and smartphones allow users to access wireless data services. Wireless data may use wireless protocols such as Long Term Evolution (LTE). Wireless communication networks providing wireless data may comprise various network elements, such as wireless access points, Mobility Management Entities (MMEs), Serving Gateways (S-GWs), PDN Gateways (P-GWs), Home Subscriber Servers (HSSs)—including other elements and systems.

The MMEs control the high-level operation of wireless communication devices in the wireless communication network. The MMEs may perform functions, such as network access control (i.e. authentication and authorization), radio resource management, mobility management, roaming management, paging, tracking area management, UE location monitoring, load balancing between S-GWs—among other functions. The MMEs may send signaling messages about issues such as security and the management of data streams. The MMEs may also retain location information for each mobile device and select the appropriate gateway during the initial registration process. The MMEs are manufactured by different manufacturers and may use different software.

A network operator may select a MME using a scheduling algorithm (i.e. Round-Robin (RR)). The MME may also be selected using the Global Unique Temporary Identifier (GUTI) transferred by the mobile device. Network operators may desire to assign users to a specific MME based on the criteria such as the services requested by the user. Users may also desire to select a specific MME. Unfortunately, current user MME selection is insufficient.

OVERVIEW

A wireless communication system connects User Equipment (UE) to Mobility Management Entities (MMEs). The wireless communication system receives a connection message from the UE. The wireless communication system connects the UE to a first MME responsive to the connection message. The wireless communication system performs MME re-selection for the UE responsive to the connection message. The wireless communication system connects the UE to a second MME responsive to the MME re-selection.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
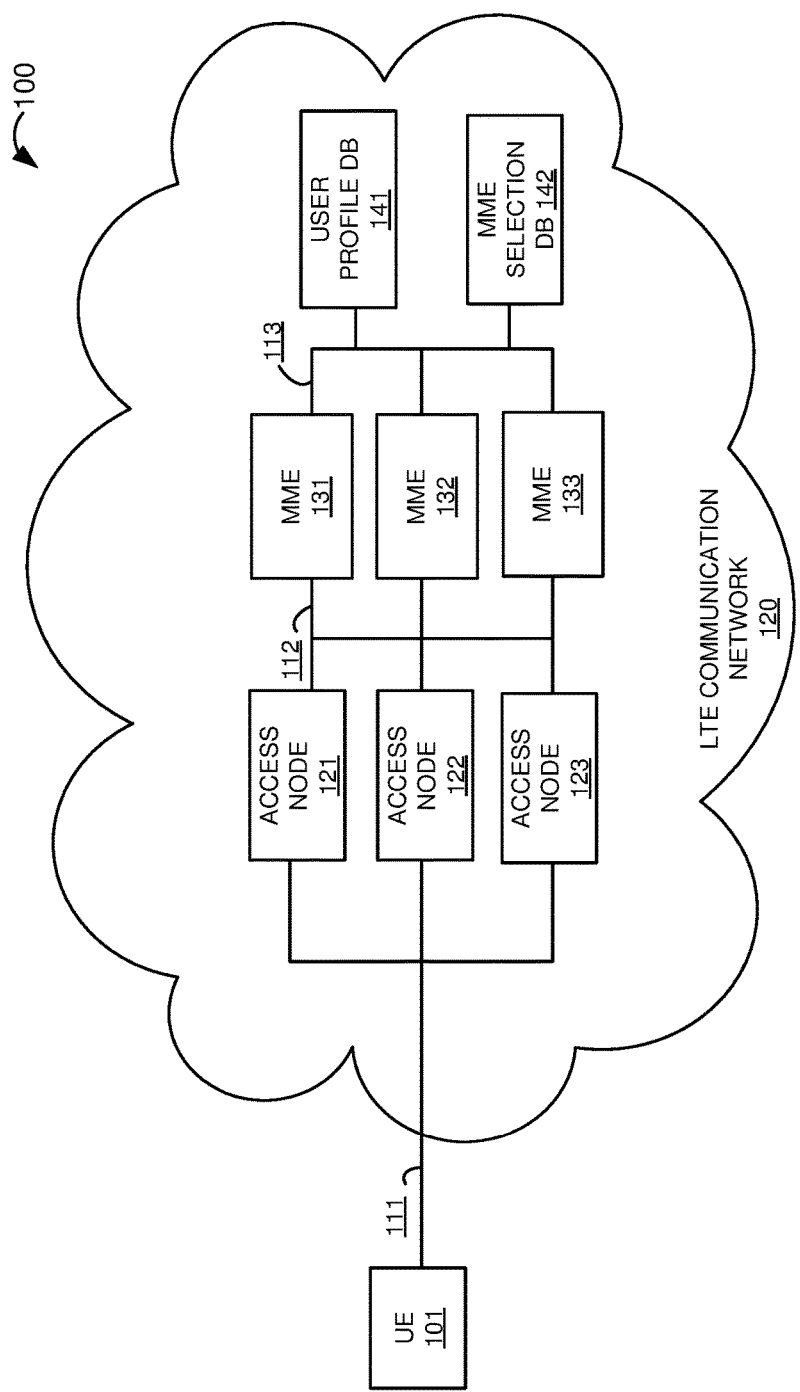
FIG. 1 illustrates a Long Term Evolution (LTE) communication system to perform a Mobility Management Entity (MME) reselection.

FIG. 1 illustrates Long Term Evolution (LTE) communication system 100 to perform a Mobility Management Entity (MME) reselection. LTE communication system 100 includes User Equipment (UE) 101 and LTE communication network 120. LTE communication network 120 includes access nodes 121-123, MMEs 131-133, User Profile Database 141, and MME selection Database 142. Although not required, User Profile Database 141 may comprise a Home Subscriber Server (HSS) or any other database containing subscriber or user information. In some examples, MME selection database 142 comprises a Domain Name Server (DNS).

UE 101 communicates with access nodes 121-123 over wireless communication link 111. Access nodes 121-123 communicate with MMEs 131-133 over communication link 112. In some examples, communication link 112 comprises backhaul links of LTE communication network 120. MMEs 131-133 communicate with User Profile DB 141 and MME selection DB 142 over communication link 113. In some examples, communication link 113 uses database access protocols, such as Diameter. LTE communication system 100 may include other elements that are omitted for clarity In operation, access point 121 receives a Radio Resource Control (RRC) connection message for a communication session from UE 101. Access point 121 assigns MME 131 to UE 101. Access point 121 may assign MME 131 using a load balancing algorithm, scheduling algorithm (i.e. Round-robin scheduling), user selection, user input, device location, session requirements, device capabilities, RF signal/quality, Globally Unique Temporary Identifier (GUTI), establishment clause, Public Land Mobile Network (PLMN) ID. MMEs may be assigned to specific users and/or services. For example, MME 131 previously assigns UE 101 a GUTI. In the RRC connection message, UE 101 may also transmit the previously assigned GUTI. Access point 121 can use the GUTI transmitted by UE 101 to identify MME 131 as previously assigned to UE 101 and reassigns MME 131 to UE 101. In some cases, if access point 121 is not connected to MME 131, then access point 121 may select or assign a new MME to serve UE 101.

MME 131 transfers a request for a user profile associated with UE 101 to User Profile database 141. MME 131 receives the user profile associated with UE 101 from User Profile database 141. In some examples, user profile includes data such as network ID, PLMN ID, requested services, user QoS, International Mobile Subscriber Identity (IMSI), Application ID, Access Point Names (APNs)—APNs may include default QCIs and bearer metadata (including Aggregate maximum Bit-Rate (AMBR), maximum Bit-Rate, and latency).

MME 131 performs a MME reselection based on the user profile to determine UE 101 should be assigned to MME 132. For example, MME 132 may be selected based on the requested services associated with the communication session. In other examples, MME 132 may be selected based on the user QoS associated with UE 101. MME 131 transfers indication of the selection of MME 132 for delivery to UE 101. In some examples, the MME 132 indication may be transmitted over NAS data between MME 131 and UE 101. After receiving indication of MME 132 from MME 131, UE transfers signaling indicating MME 132 to access node 121. In some examples, UE 101 may transfer another RRC message indicating MME 132. Access point 121 assigns UE 101 to MME 132 for the communication session. In some examples, access point 121 transfers a S1AP message to MME 132.

Although not required, the MME reselection may be triggered by a flag in the RRC message. In some examples, the MME reselection may be triggered by user input, for instance, user input may be received via a user interface that allows the user to select a specific MME. In another example, a user of UE 101 may select a service associated with the communication session and the selected service may be included in the user profile, MME 132 is selected based on the selected service. In some examples, different MMEs may be assigned for different services such as gaming, media streaming, business use, etc.

Examples of communication sessions include text messaging, voice calling, video calling, media streaming, video conferencing, gaming, emergency communications, emailing, and/or other types of communication sessions—including combinations thereof. In some examples, access nodes 121-123 comprise evolved Node Bs (eNodeBs), base transceiver stations, base stations, and/or other access points—including combinations thereof. Examples of UE 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

Figure 2:
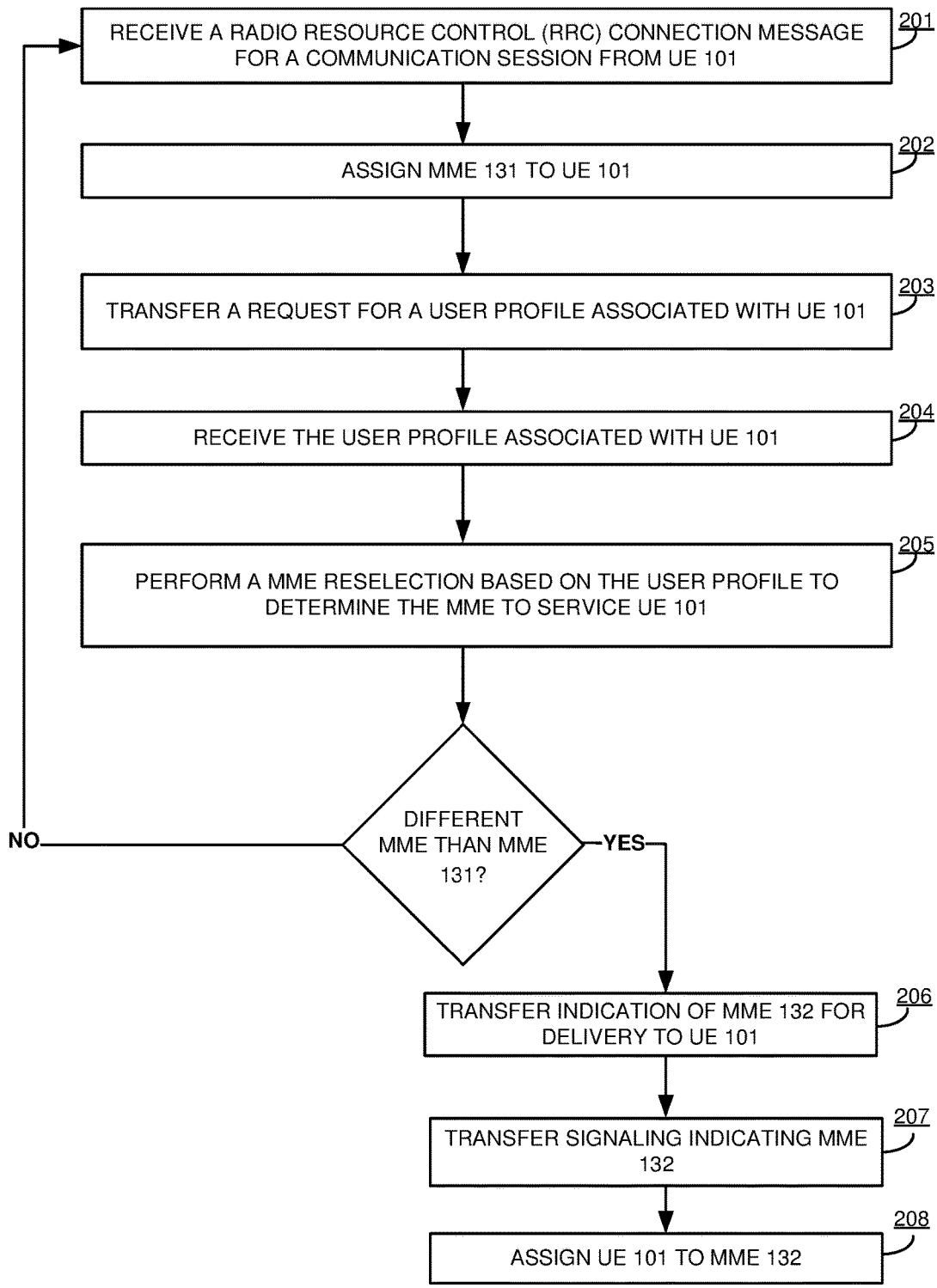
FIG. 2 illustrates the operation of the LTE communication system to perform the MME reselection.

FIG. 2 illustrates the operation of LTE communication system 100 to perform a MME reselection. Access node 121 receives a RRC connection message for a communication session from UE 101 (201). Although not required, the RRC connection message may comprise a Non-Access Stratum (NAS) message. In some examples, the initial attach request includes information such as PLMN, tracking area, IMSI, requested services, and/or initial MME selection.

Access node 121 assigns MME 131 to UE 101 (202). In some examples, access node 121 assigns MME 131 using the establishment clause. For instance, MME 131 may be designated for emergency communications. The RRC message transferred from UE 101 contains an emergency establishment clause. In other examples, access node 121 may assign MME 131 based on MME load. Although not required, UE 101 may indicate MME 131 as a selected MME. In yet other examples, UE 101 may indicate requested services and access point 121 may assign MME 131 based on the requested services. In some examples, user MME selection may override the MME reselection process. In other examples, the MME reselection may override a user MME selection.

MME 131 transfers a request for a user profile associated with UE 101 to User Profile database 141 (203). MME 131 receives the user profile associated with UE 101 from User Profile database 141 (204). MME 131 performs the MME reselection based on the user profile to determine another MME to serve UE 101 (205). In some examples, MME performs a Domain Name Server (DNS) lookup based on the user profile.

The MME reselection may also be based on a UE mode such as home, work, and/or time of day (TOD). For instance, a trucking company may desire to track the location and/or movement of its employees during work hours, therefore a UE may be assigned to the "tracking" or corporate MME during work hours. The MME reselection may also be based on a UE mobility status (i.e. mobile, static, secret), location (including Physical Cell ID (PCI)/Cell ID), QoS, and/or other basis—including combinations thereof. For example, a mobile UE may be assigned to a different MME than a static UE.

In this example, MME 132 is selected to serve UE 101 instead MME 131. UE 101 may be one of a group of users that is assigned to MME 132 (i.e. first responders, corporate users, etc.). In other examples, UE 101 may be requesting a service assigned to MME 132 (i.e. VoLTE, gaming, media streaming, video conferencing, emergency, business). MME 131 transfers indication of the selection of MME 132 for delivery to UE 101 (206). UE 101 transfers signaling indicating MME 132 to access point 121 (207). UE may send a RRC message indicating MME 132 to access point 121. Access point 121 assigns UE 101 to MME 132 for the communication session (208). In some examples, access point 121 transfers a S1AP message to MME 132. In some examples, MME 132 comprises a "smart" MME that is used to assign/reselect MMEs for UEs.

Figure 3:
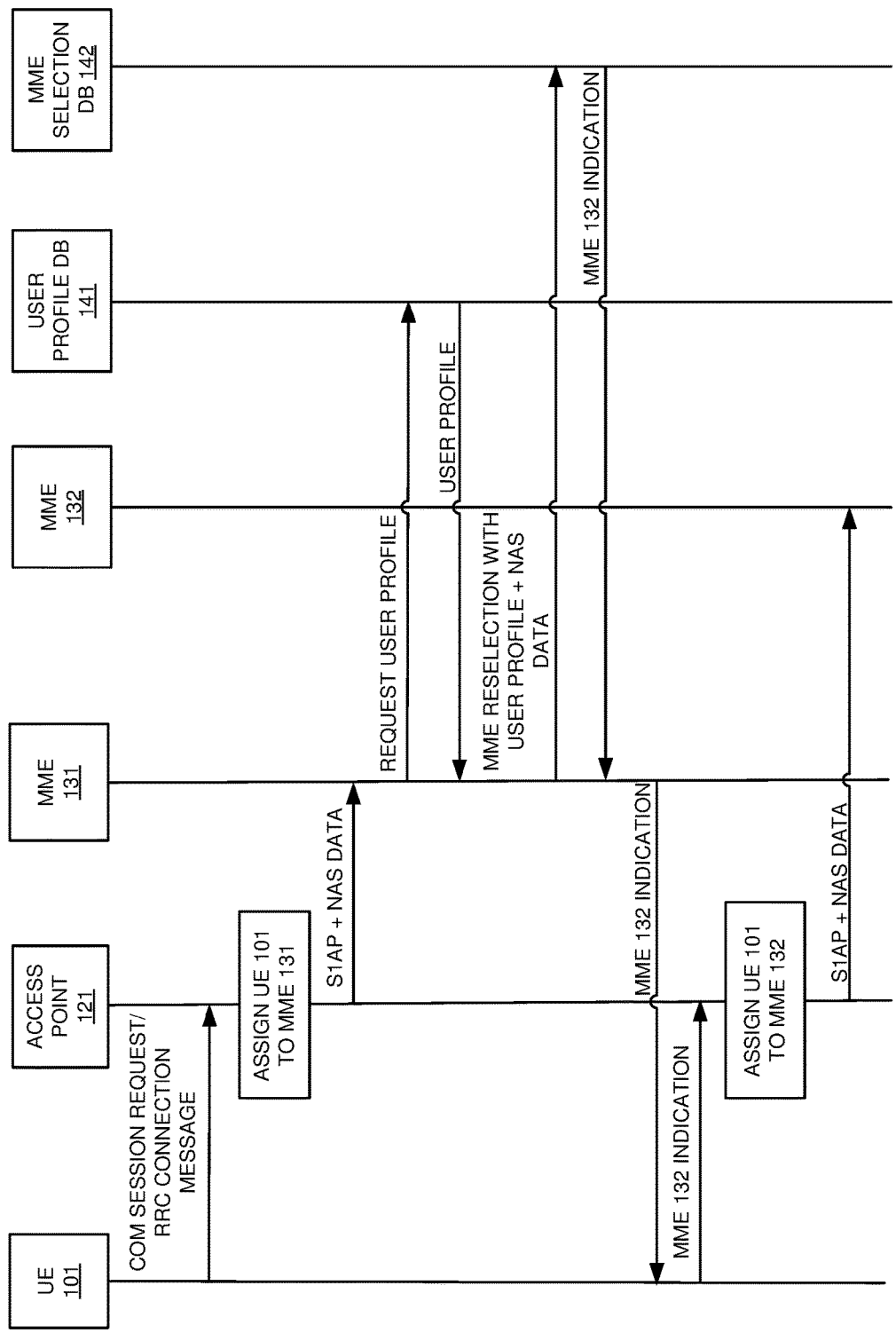
FIG. 3 illustrates the operation of the LTE communication system to perform the MME reselection.

FIG. 3 illustrates the operation of LTE communication system 100 to perform a MME reselection. Access point 121 receives a RRC connection message for a communication session from UE 101. Access point 121 assigns MME 131 to UE 101. For example, access point 121 uses a Round-Robin scheduling algorithm to assign MME 131 to UE 101. Access point 121 transfers a S1AP message and NAS data to MME 131.

MME 131 transfers a request for a user profile associated with UE 101 to User Profile database 141. MME 131 receives the user profile associated with UE 101 from User Profile database 141. MME 131 performs the MME reselection based on the user profile to determine that UE 101 should be assigned to MME 132 instead of MME 131. In some examples, the MME reselect may be performed by other network elements. MME 131 transfers indication of the selection of MME 132 for delivery to UE 101. UE 101 transfers signaling indicating MME 132 to access node 121. Access node 121 assigns UE 101 to MME 132 for the communication session. In other examples. MME 131 may perform an MME handover to MME 132.

For example, user of UE 101 may be traveling on a train. The user profile for UE 101 may indicate that UE 101 has a velocity greater than 40 mph or some predetermined threshold. MME 131 performs the MME reselection using the user profile and the mobility status to select MME 132 to serve UE 101. In this example, MME 132 is a MME that serves mobile UEs.

In another example, the user profile associated with UE 101 indicates UE 101's location is at work. MME 131 determines time of day. In some examples, time of day may be determined by other means. Based on the location of UE 101 and TOD, MME 131 selects MME 132 to serve UE 101. In this example MME 132 may comprise a corporate MME.

In another example, the user profile associated with UE 101 indicates UE 101's location is at home. MME 131 determines time of day. Based on the user profile, location, and TOD, MME 131 selects MME 132 to serve UE 101. In this example, MME 132 comprises a non-corporate MME.

Figure 4:
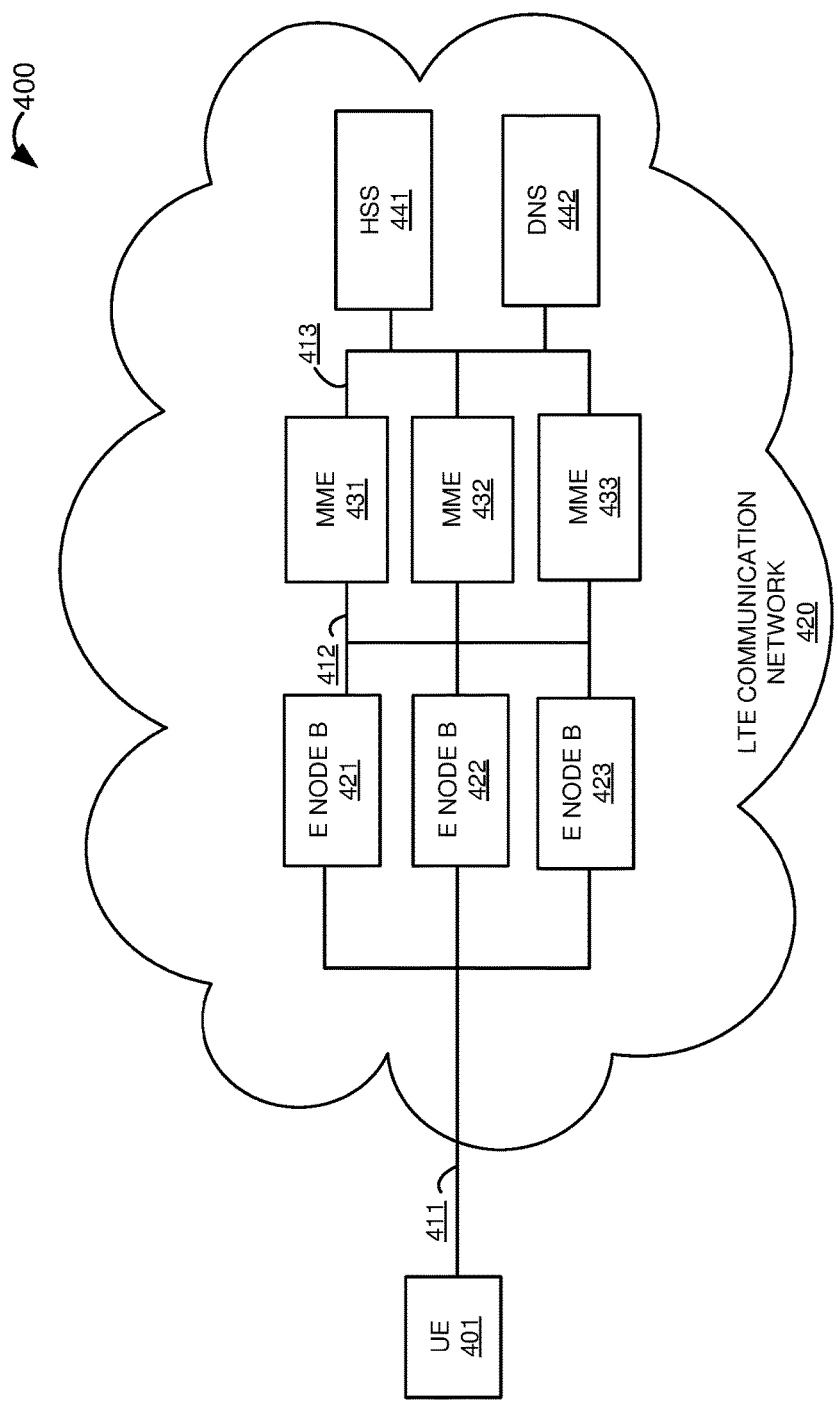
FIG. 4 illustrates a LTE communication system to perform a MME reselection.

FIG. 4 illustrates Long Term Evolution (LTE) communication system 400 to perform a MME reselection. LTE communication system 400 includes User Equipment (UE) 401 and LTE communication network 420. LTE communication network 420 includes eNodeBs 421-423, MMEs 431-433, Home Subscriber Server (HSS) 441, and Domain Name Server (DNS) 442. UE 401 communicates with eNodeBs 421-423 over wireless link 411. ENodeBs 421-423 communicate with MMEs 431-433 over backhaul link 412. MMEs 431-433 communicate with HSS 441 and DNS 442 over communication link 413. LTE communication system 400 may include other elements not pictured for clarity.

ENodeB 421 receives a RRC connection message for a communication session from UE 401. ENodeB 421 assigns MME 431 to UE 401. For example, eNodeB 421 assigns MME 431 based on the requested services for the communication session. ENodeB 421 transfers a S1AP message to MME 431. MME 431 is overloaded and determines it needs to perform a MME reselection to reassign UE 401.

MME 431 transfers a request for a user profile associated with UE 401 to HSS 441. For example, MME 431 transfers a Diameter message to HSS 441 requesting the user profile associated with UE 401. MME 431 receives the user profile associated with UE 401 from HSS 441. MME 431 performs the MME reselection based on the user profile to determine UE 401 should be assigned to MME 432. In some examples, the MME reselection selects MME 431 to serve UE 401. In some examples, the reselect is triggered by a flag in the RRC message. In other examples, the MME reselect may be triggered when the selected MME is not available.

MME 431 transfers indication of the selection of MME 432 for delivery to UE 401. The indication could be in NAS data transferred directly from MME 431 to UE 401. In other examples, MME 431 transfers the indication to eNodeB 421 and eNodeB 421 transfers the indication to UE 401 over a RRC message. UE 401 transfers signaling indicating MME 432 eNodeB 421. The signaling may comprise a RRC message. ENodeB 421 assigns UE 401 to MME 432. In some examples, eNodeB 421 transfers the RRC message via a S1AP message to MME 432. Although not required, MME 431 may perform a MME handoff to MME 432.

Figure 5:
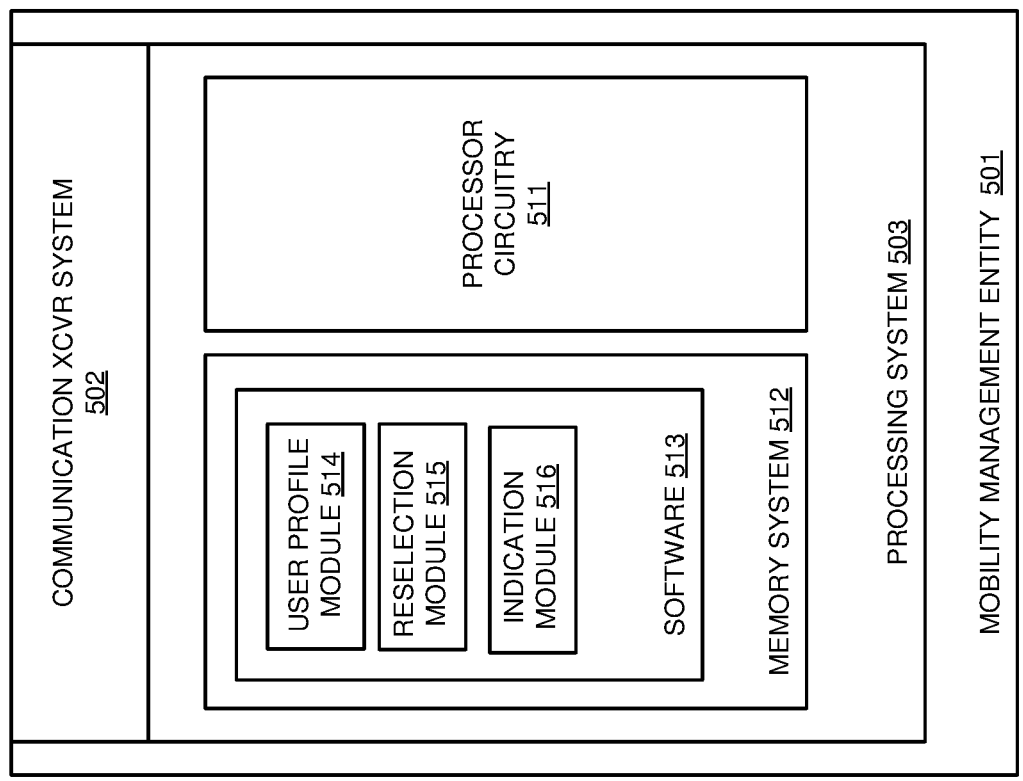
FIG. 5 illustrates an example of an MME to perform a MME reselection.

FIG. 5 illustrates MME 501. MME 501 is an example of MMEs 131-133 and MMEs 431-433. Although these systems may use alternative configurations and operations. MME 501 comprises communication transceiver system 502 and processing system 503. Processing system 503 includes processing circuitry 511 and memory system 512 that stores software 513. Software 513 comprises software modules 514-516.

Communication transceiver systems 502 comprise components that communicate over communication links such as network cards, ports, RF transceivers, processing circuitry and software, or some other communication components. Communication transceiver systems 502 may be configured to communicate over metallic, wireless, or optical links. Communication transceiver systems 502 may be configured to use TDM, IP, Ethernet, optical networking, wireless protocols, communication signaling, or some other communication format—including combinations thereof. Communication transceiver system 502 may transfer requests for user profile information to the user profile database and indication of the selected MME to the UE. Communication transceiver systems 502 may also receive S1AP messages and user profile information.

Processor circuitry 511 comprises microprocessor and other circuitry that retrieves and executes operating software 513 from memory system 512. Processor circuitry 511 may comprise a single device or could be distributed across multiple devices—including devices in different geographic areas. Processor circuitry 511 may be embedded in various types of equipment. Examples of processor circuitry 511 include central processing units, application specific processors, logic devices, and/or any type of computer processing devices—including combinations thereof. Processor circuitry 511 performs the MME reselection to determine an MME to assign to a UE.

Memory system 512 comprises a non-transitory computer readable storage medium readable by processing system 503 and capable of storing software 513, such as a disk drive, flash drive, data storage circuitry, or some other hardware memory apparatus—including combinations thereof. Memory system 512 can include volatile and non-volatile, removable and non-removable media implemented in any method or technology for storage of information, such as computer readable instructions, data structures, program modules, or other data—including combinations thereof. Memory system 512 may comprise a single device or could be distributed across multiple devices—including devices in different geographic areas. Memory system 512 may be embedded in various types of equipment. In some examples, a computer apparatus could comprise memory system 512 and software 513.

Software 513 comprises computer programs, firmware, or some other form of machine-readable processing instructions. Software 513 may include an operating system, utilities, drivers, network interfaces, applications, or some other type of software. In this example, software 513 comprises user profile module 514, reselection module 515, and indication module 515. Although software 513 could have alternative configurations in other examples.

Software 513 may be implemented in program instructions and may be executed by processing system 503. Software 513 may include additional processes, programs, or components, such as operating system software, database software, or application software—including combinations thereof. Software 513 may also comprise firmware or some other form of machine-readable processing instructions executable by processing system 503.

When executed, software 513 directs processing system 503 to operate as described herein to perform a MME reselection. In particular, user profile module 514 directs processing system 503 to transfer a request for the user profile. Reselection module 515 directs processing system 503 to perform the MME selection to determine an MME to service a UE. Indication module 516 directs processing system 503 to transfer an indication of the selected MME to the UE.

Figure 6:
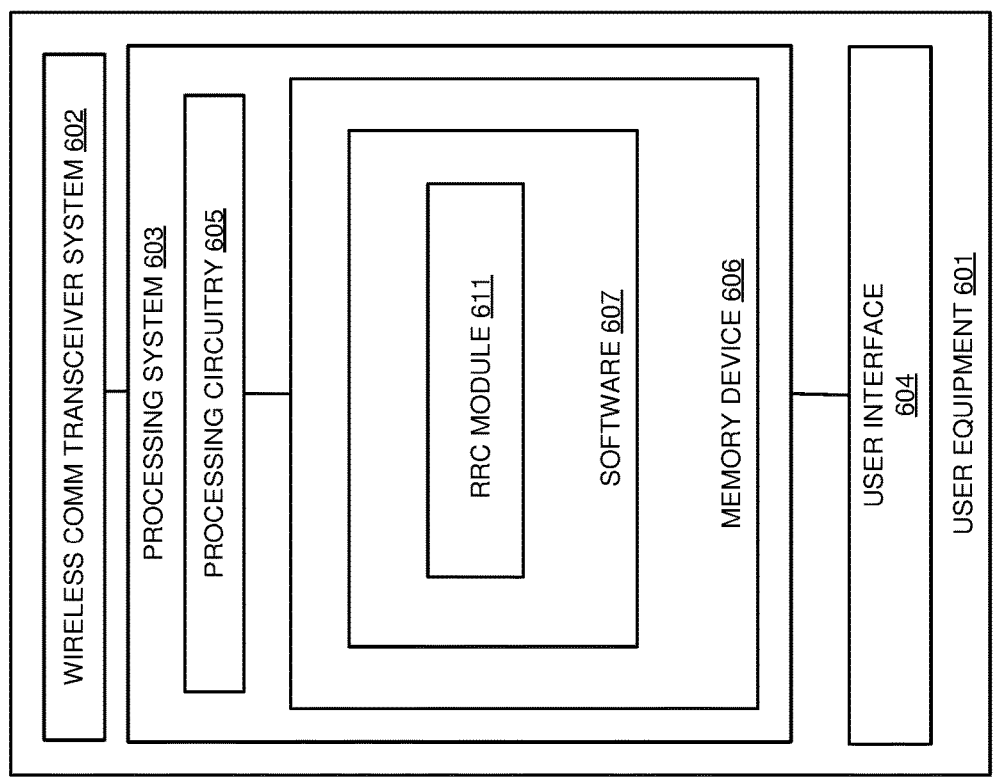
FIG. 6 illustrates an example of User Equipment to perform a MME reselection

FIG. 6 illustrates User Equipment (UE) 601. UE 601 is an example of UE 101 and UE 401, although UE 101 and UE 401 could use alternative configurations. UE 601 comprises wireless communication transceiver system 602, processing system 603, and user interface 604. Processing system 603 is linked to wireless communication transceiver system 602 and user interface 604. Processing system 603 includes processing circuitry 605 and memory device 606 that stores operating software 607. UE 601 may include other well-known components such as a battery and enclosure that are not shown for clarity. UE 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as LTE, CDMA, EVDO, WIMAX, GSM, WIFI, HSPA, or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606, portions of wireless communication transceiver system 602, and user interface 604. Operating software 607 comprises computer programs, firmware, or some other form of machine-readable processing instructions. Operating software 607 may include an operating system, utilities, drivers, network interfaces, applications, or some other type of software. When executed by processing circuitry 605, operating software 607 directs processing system 603 to operate user equipment 601 as described herein.

When executed, software 607 directs processing system 603 to operate as described herein to perform a MME reselection. In particular, RRC module 611 directs processing system 603 to transfer a RRC message indicating the selected MME.

Referring back to FIG. 1, UE 101 comprises Radio Frequency (RF) communication circuitry and an antenna. The RF communication circuitry typically includes an amplifier, filter, modulator, and signal processing circuitry. UE 101 may also include a user interface, memory device, software, processing circuitry, or some other communication components. UE 101 may be a telephone, computer, e-book, mobile Internet appliance, wireless network interface card, media player, game console, or some other wireless communication apparatus—including combinations thereof.

Access nodes 121-123 comprise RF communication circuitry and antennas. The RF communication circuitry typically includes an amplifier, filter, RF modulator, and signal processing circuitry. Access nodes 121-123 may also comprise a router, server, memory device, software, processing circuitry, cabling, power supply, network communication interface, structural support, or some other communication apparatus. Access nodes 121-123 could be an eNodeB, base transceiver station, base station, Internet access node, telephony service node, wireless data access point, or some other wireless communication system—including combinations thereof.

MMEs 131-133 comprise a computer system and communication interface. MMEs 131-133 may also include other components such as a router, server, data storage system, and power supply. MMEs 131-133 may reside in a single device or may be distributed across multiple devices. MMEs 131-133 are shown externally to access nodes 121-123, but MMEs 131-133 could be integrated within the components of access nodes 121-123.

LTE network 120 comprises network elements that provide communications services to UE 101 through access nodes 121-123. LTE network 120 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-113 use metal, glass, air, space, or some other material as the transport media. Communication links 112-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-113 are representative and may include intermediate links, systems, and networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to connect User Equipment (UE) to Mobility Management Entities (MMEs), the method comprising:
   receiving a connection message from the UE that indicates one of a Voice over Long Term Evolution (VoLTE) service and an interactive gaming service;
   connecting the UE to an initial MME responsive to the connection message;

when the VoLTE service indication is in the connection message, performing MME re-selection for the UE responsive to the VoLTE service indication in the connection message and connecting the UE to a VoLTE MME for the VoLTE service; and when the interactive gaming service indication is in the connection message, performing MME re-selection for the UE responsive to the interactive gaming service indication in the connection message and connecting the UE to an interactive gaming MME for the interactive gaming service.

2. The method of claim 1 wherein the connection message indicates one of the VoLTE MME and the interactive gaming MME.

3. The method of claim 1 wherein performing the MME re-selection for the UE comprises selecting the second MME based on the VoLTE service indication in the connection message and a user profile for the UE.

4. The method of claim 1 wherein the connection message comprises a Radio Resource Control (RRC) message.

5. The method of claim 1 wherein the connection message comprises a Non-Access Stratum (NAS) message.

6. A wireless communication system to connect User Equipment (UE) to Mobility Management Entities (MMEs) comprising:

a wireless access point configured to receive a connection message from the UE that indicates one of a Voice over Long Term Evolution (VoLTE) service and an interactive gaming service and responsively connect the UE to an initial MME;

when the VoLTE service indication is in the connection message, the initial MME configured to perform MME re-selection for the UE responsive to the VoLTE service indication in the connection message and direct the wireless access point to connect the UE to a VoLTE MME for the VoLTE service;

when the interactive gaming service indication is in the connection message, the initial MME configured to perform MME re-selection for the UE responsive to the interactive gaming service indication in the connection message and direct the wireless access point to connect the UE to an interactive gaming MME for the interactive gaming service; and the wireless access point configured to connect the UE to the VoLTE MME or the interactive gaming MME responsive to the direction from the initial MME.

7. The wireless communication system of claim 6 wherein the connection message indicates one of the VoLTE MME and the interactive gaming MME.

8. The wireless communication system of claim 6 wherein the connection message comprises a Radio Resource Control (RRC) message.

9. The wireless communication system of claim 6 wherein the connection message comprises a Non-Access Stratum (NAS) message.

* * * * *